United States Patent [19]

Lecomte et al.

[11] Patent Number: 5,065,425
[45] Date of Patent: Nov. 12, 1991

[54] TELEPHONE CONNECTION ARRANGEMENT FOR A PERSONAL COMPUTER AND A DEVICE FOR SUCH AN ARRANGEMENT

[75] Inventors: Daniel Lecomte, Paris; Norbert Galopin, Sannois; Jacques Lemaistre, Argenteuil, all of France

[73] Assignee: Telic Alcatel, Paris, France

[21] Appl. No.: 457,059

[22] Filed: Dec. 26, 1989

[30] Foreign Application Priority Data

Dec. 23, 1988 [FR] France .................. 88 17101

[51] Int. Cl.$^5$ .......................................... H04M 11/00
[52] U.S. Cl. ......................................... 379/93; 379/96
[58] Field of Search ............... 379/93, 96, 94, 442, 379/443

[56] References Cited

U.S. PATENT DOCUMENTS

| | | | |
|---|---|---|---|
| 4,546,212 | 10/1985 | Crowder, Sr. ............... | 370/76 |
| 4,549,290 | 10/1985 | Bell ............................. | 379/93 |
| 4,670,874 | 6/1987 | Sato et al. .................... | 379/93 |
| 4,776,005 | 10/1988 | Petriccione et al. ......... | 379/96 |
| 4,897,866 | 1/1990 | Majmudar et al. ........... | 379/96 |
| 4,907,267 | 3/1990 | Gutzmer ....................... | 379/93 |
| 4,987,588 | 1/1991 | Fukuma et al. ............... | 379/93 |

FOREIGN PATENT DOCUMENTS 0238255 9/1987 European Pat. Off.
2452842 10/1980 France.
2472319 6/1981 France.

OTHER PUBLICATIONS

AT&T Technology, vol. 1, No. 1, 1986, pp. 36-37-L. K. Pederson et al.-"The PC/PBX Connection".

Primary Examiner—James L. Dwyer
Assistant Examiner—Stella L. Woo
Attorney, Agent, or Firm—Sughrue, Mion, Zinn, Macpeak & Seas

[57] ABSTRACT

An arrangement for connecting a personal computer (1) to a telephone network (2) via a digital exchange, in particular a private exchange (13), and via a telephone set (3) or subscriber terminal suitable for processing telephone signalling and enabling digital voice and data signals to be transferred simultaneously, the telephone set or subscriber terminal being controlled by an internal processor (14) of a controlling logic circuit (9) and including a data transmission (4B) for connection to a computer apparatus such as a computer. The coupler (4) is integrated in the telephone set and is connected to the controlling logic circuit (9) of the telephone set, which diverts the telephone signalling transmitted to the controlling logic circuit of the telephone towards an external access (1A1 or 1A2) to the bus of the personal computer, and which selectively replaces the telephone signalling which the telephone would normally transmit to the exchange by corresponding signalling produced by the personal computer.

6 Claims, 2 Drawing Sheets

TELEPHONE CONNECTION ARRANGEMENT FOR A PERSONAL COMPUTER AND A DEVICE FOR SUCH AN ARRANGEMENT

The invention relates to arrangements for enabling a personal computer to be connected to a telephone network, and it also relates to a connection device for such arrangements.

BACKGROUND OF THE INVENTION

Personal computers were initially connected to the telephone network by means of telephone couplers which were connected either via a telephone handset or via a modem associated with a telephone set, thereby enabling data to be transmitted in the telephone band between the computer and remote compatible computer equipment via telephone apparatus (integrated or otherwise) at said computer equipment and after a telephone call had been established by means of the telephone set to the telephone apparatus of said remote computer equipment. However, such a solution is not very satisfactory particularly insofar as the user must switch back and forth between acting on the telephone set and the on computer while setting up a call, during transmission over the telephone network, and while clearing down a call, thereby increasing the danger of making mistakes.

At present, personal computers are more commonly connected to a public or private telephone network by means of a circuit card which is connected to an extension connector (or "slot") incorporated in the computer for possible adaptations. Such a circuit card performs the telephone functions normally performed by subscriber telephone sets and by the subscribers themselves, e.g. dialing like a subscriber or detecting ringing like a telephone set.

One of the drawbacks of such an arrangement is that it monopolizes one of the extension connectors of the computer and the number of such connectors is often insufficient.

In addition, the connection between the computer and a telephone line takes place in this case either in parallel with a telephone set which is temporarily taken out of use while the computer is using the line, or else instead of a telephone set with the telephone line then being reserved for the computer only.

SUMMARY OF THE INVENTION

The present invention thus provides a device for enabling a personal computer to be connected to a telephone network via a digital exchange, in particular a private exchange, to which it is connected via a telephone set or subscriber terminal suitable for processing telephone signalling and enabling digital voice and data signals to be transferred simultaneously, the telephone set or terminal being controlled by an internal processor in a controlling logic circuit and being provided for this purpose with a data transmission interface for connection to an external computer apparatus, such as another computer.

According to the invention, the device comprises a coupler integrated in the telephone set and connected to the processor thereof which is provided with means for diverting telephone signalling sent to the telephone set towards an external access to the bus of a personal computer and with means for selectively replacing the signalling which said telephone set would normally transmit to the exchange with corresponding signalling produced by the personal computer, with the data transmissions transitting to and from the personal computer taking place separately via the transmission interface. In addition, the personal computer includes purely software means for producing the replacement telephone signalling which transits via the same circuits of the telephone set that are also used for conveying telephone signalling coming from the internal processor of the telephone set.

BRIEF DESCRIPTION OF THE DRAWINGS

An embodiment of the invention is described by way of example with reference to the accompanying drawings, in which.

DETAILED DESCRIPTION

Figure 1:
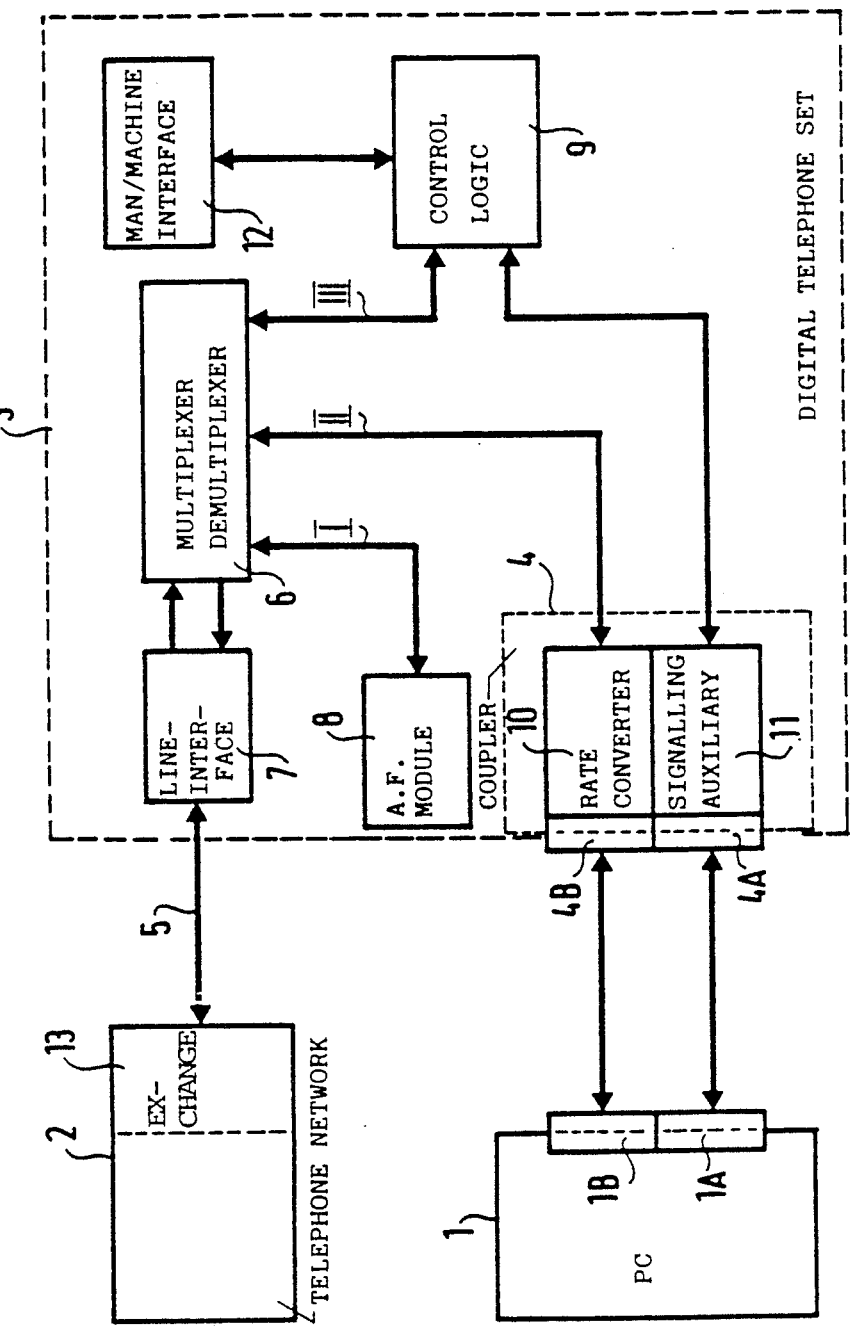
FIG. 1 is a block diagram of a connection arrangement of the invention between a personal computer and a telephone network via a digital telephone set.

The connection arrangement shown in FIG. 1 is intended to enable a personal computer 1 to be put into communication with any compatible equipment via a telephone network 2 to which the computer is connected via a digital telephone set 3 which is provided with an appropriate coupler 4 and which is connected by a telephone line 5 to an exchange 13 integrated in or connected to the network 2.

The computer 1 is a conventional type of apparatus such as a model sold by IBM or a competing model sold by APPLE, for example. Such a computer is provided with connectors enabling it to be connected to external apparatuses, and in particular a connector 1A giving access to an internal bus for communicating with the computer processor(s) and its memories.

A second connector 1B is conventionally provided for enabling digital data to be interchanged between the computer and an external apparatus via a standardized interface, e.g. a standardized RS 232 C type connector or a standardized V24 type asynchronous junction interface.

The telephone network 2 is a network enabling digital voice and data signals to be transferred, e.g. a time division digital network of the E10B or MT20 types provided by ALCATEL CIT, and the computer 1 is connected thereto via a digital telephone set which is itself connected to the network 2 via a digital exchange 13 of the private type. The network may possibly be an integrated services digital network, ISDN, to which the computer 1 is connected via a terminal telephone set suitable for connection to a standardized reference point "S", either directly or else via a terminal adapter, and for partaking in the standardized data link protocol, LAPD (link access protocol on the D channel).

The fundamental characteristics of ISDNs as defined in recommendations of the International Telegraph and Telephone Consultative Committee (CCITT) are not described in greater detail herein since they are described in numerous publications, for example in the work "Le RNIS, techniques et atouts" (ISDN techniques and advantages) published in France in 1987 in the Telecommunications Scientific and Technical Collection by a group using the pen-name G. DICENET.

The characteristics of a digital telephone set 3 suitable for connection to a digital exchange 13 and the characteristics of the exchange are described, for example, in an article entitled "L'autocommutateur multiservice OPUS 4000" (The OPUS 4000 multiservice exchange) by BAUDOIN, LE, MEJANE, SEVEQUE, and ANIZAN in the journal "Commutation et Transmission" (Switching and Transmission), No. 4, 1985.

The digital telephone set 3 is connected to the telephone network 2 via a private exchange 13 over a two-way link 5 having one or two pairs of wires for simultaneously transmitting both digital signals representative of voice or sound and digital data signals, said signals being transmitted asynchronously at 19200 bauds in one case and 4800 bauds in the other, for example. As mentioned above, the term "subscriber terminal" is used to cover any apparatus which is directly connectable to a telephone link and is capable of processing line signalling like a normal telephone set.

To this end, the digital telephone set 3 is connected to the link 5 via a multiplexer/demultiplexer 6 which is connected to the link via a line interface 7.

The line interface 7 is conventional and handles the physical level of the digital link, serving in particular to transmit and modulate/demodulate pulse signals constituting data while providing DC isolation between the link 5 and the digital telephone set 3, conventionally by means of at least one transformer (not shown).

The multiplexer/demultiplexer 6 serves both to build up and to break down the signals interchanged over the link 5, which signals are associated, for example, with three two-way channels: an 8 Kbit/s channel for signalling over the link 5, another 8 Kbit/s channel for data, and a 64 Kbit/s channel for interchanging voice or data signals.

The multiplexer/demultiplexer 6 is connected via a link I to an audio frequency module 8 which converts sound signals into digital form and vice versa by means of a cofidec (coderfilter-decoder), not shown. The cofidec is connected to sound transducers such as a microphone, and an earphone or a loudspeaker of the telephone set via appropriate adapter circuits, and it serves both to digitally encode sound signals received by the telephone into PCM samples, and also to convert PCM samples received over the link 5 into electrical signals for the sound transducers.

The multiplexer/demultiplexer 6 is also connected via a two-way link III to a controlling logic circuit 9 organized around a processor and associated memories, with which it interchanges signalling data concerned with operating the telephone set by establishing dialog for this purpose between the telephone set and the exchange to which it is connected.

The multiplexer/demultiplexer 6 is also connected to a connector 4B via a two-way link II and a data transmission interface constituted by a data rate converter 10 in the coupler 4, thereby enabling the telephone set 3 to serve as an intermediary between an external apparatus such as the computer 1 and the telephone network to which it is itself connected. In a conventional embodiment, the connector 4B is of the RS232C type and it serves to transfer asynchronous alphanumeric signals transmitted by the computer 1 via a complementary connector 1B fitted to one of the ports of the computer, and also signals transmitted to the computer 1 by computer apparatus which may be identical or complementary and/or compatible, e.g. a server (not shown) over the digital telephone network 2 to which the computer apparatus is connected or of which it may optionally constitute a part.

In accordance with the invention, the computer 1 is additionally connected to the digital telephone network 2 via an auxiliary signalling circuit 11 integrated in the coupler 4 and accessible from outside the digital telephone set 3 via a connector 4A which is complementary to a connector 1A contained in the bus extension port of the computer 1. This makes it possible to interchange signalling directly between the appropriately programmed computer 1 and the exchange in the telephone network 2 to which the telephone 3 is connected, with the computer 1 then temporarily taking the place of the controlling logic 9 of the telephone.

In one form of operation, the various functions provided by the man/machine interface 12 of the digital telephone set 3, i.e. functions relating to the keypad and to the display lamps, may be taken over by the computer 1 whose keyboard, screen, and possible other accessories (not shown) duplicate or replace the various units or accessories of the telephone.

This makes it possible firstly to enhance the options offered by the digital telephone 3 by adding options specific to the computer, such as a large, high-definition screen, and alphabetic keyboard, a mouse, and considerable storage and processing facilities, and secondly to enhance the options offered by the computer 2 by enabling it to take the place of the telephone set merely by modifying or adding software.

It then becomes possible to perform advanced telephone functions such as:

transcribing in the clear all of the services which are normally made accessible by dialing a code;

setting up a personal directory;

consulting the directory of the exchange;

dialing directly from said directories;

providing a graphics representation of the telephone set with its functions being made accessible by moving the mouse;

transforming the computer into a workstation for simultaneous voice and data;

making effective use of voice and text bulletin boards;

providing a private computer bulletin board operating as an answering machine; and making up a list of unanswered incoming calls together with the names of the corresponding callers.

By virtue of the connection via the coupler 4, the telephone set then constitutes an accessory which is directly operable by the computer which is controlled in the usual way. For example, the telephone set may be shown directly on the screen of the computer 1 and the representations of the keys on the telephone may be operated by clicking them with a mouse, thereby obtaining the corresponding control functions.

Figure 2:
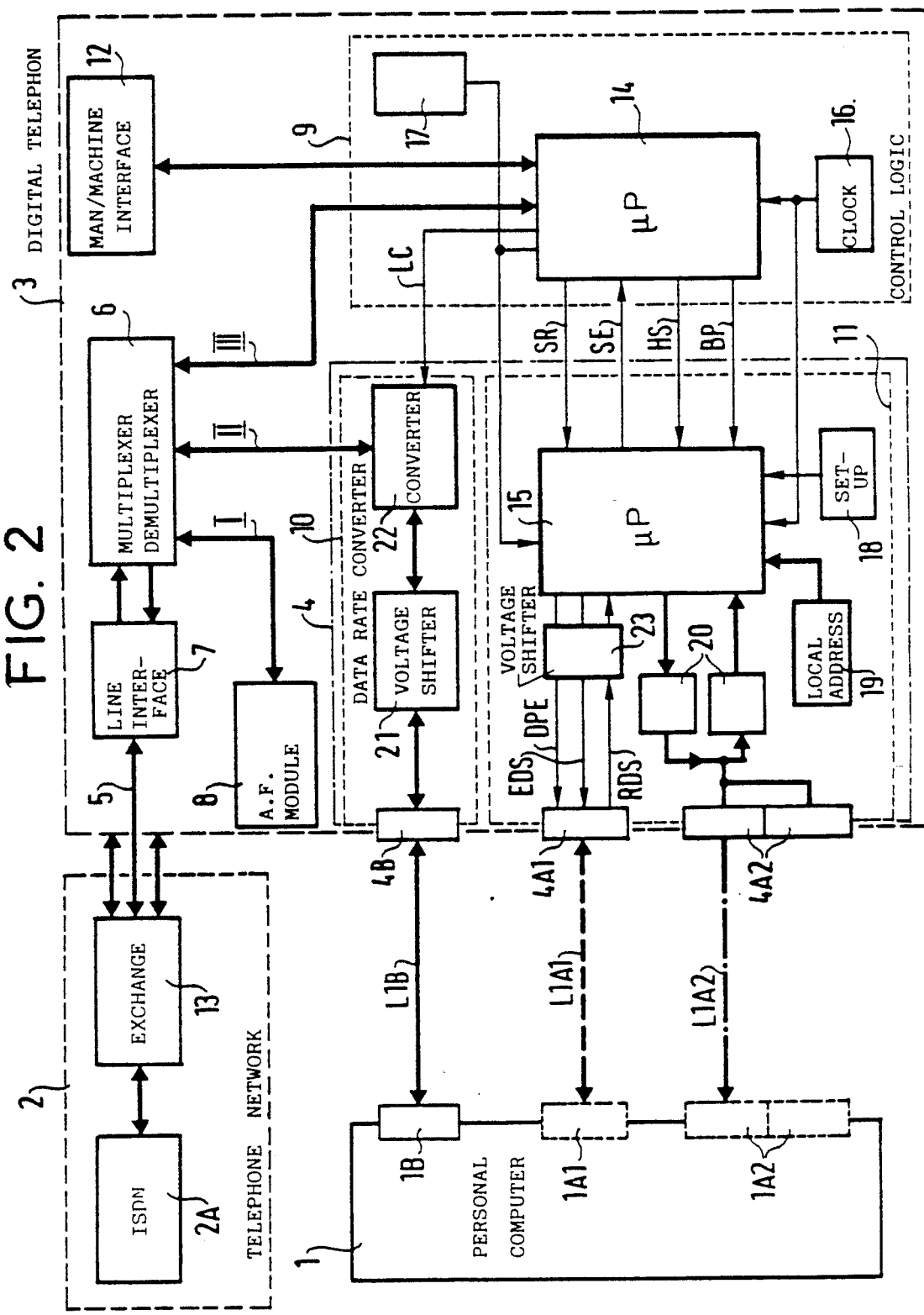
FIG. 2 is a more detailed diagram of the arrangement including a connection device of the invention.

The embodiment of a connection arrangement shown in greater detail in FIG. 2 relates essentially to the additions made to the coupler 4 of a digital telephone set 3 for the purpose of serving a personal computer 1.

The digital telephone set 3 is shown in this case being connected via a link 5 as described above to a digital exchange 13 which is generally a private exchange, and e.g. of the same type as described above. The exchange 13 is itself connected to a multiservice network 2A as mentioned above.

The digital telephone set 3 includes items 6, 7, 8, 9, 10, 11, and 12 as described above and is intended to enable the computer 1 to be connected in series or in parallel depending on the extension procedure provided for the computer.

To this end, the digital telephone set 3 which is conventionally provided with a connector 4B for a V24 or an RS 232C interface for connection to a port of a computer or peripheral equipment provided with a complementary connector, also includes at least one other connector for connection to a bus extension port of a computer.

In the example shown, the digital telephone set 3 has a first bus connector 4A1, e.g. of the RS 232C type or for a V24 interface, enabling the telephone to be connected to the bus of the computer 1, possibly in parallel with other peripheral equipment in a star type connection structure.

Two other connectors 4A2 correspond respectively to two ADB connectors for computers and peripherals in the APPLE range enabling the telephone to be connected in series on the bus of the computer 1 optionally together with other peripherals thereof (not shown), e.g. the keyboard of the computer and/or a mouse, etc.

The digital telephone set 3 makes it possible either to connect a computer 1 via a link L1B between connectors 1B and 4B for interchanging data and via a link L1A1 between connectors 1A1 and 4A1 for interchanging signalling, or else via a link L1B for interchanging data and via a link having two opposite direction one-way channels L1A2 respectively for receiving and for sending signalling to and from the computer 1, and depending on the facilities provided by the computer.

The link L1B is practically connected to the link II via the data rate converter 10 which in this case combines a voltage shifter assembly 21 and a converter module 22. The voltage shifting 21 is conventional and serves to ensure that the voltages of the signals interchanged between the computer 1 and the multiplexer/demultiplexer 6 via the link II are at compatible levels. The converter module 22 operates in conventional manner to change data rates and is configured for this purpose by the controlling logic circuit 9, as symbolized by link LC.

The connectors 4A1 and 4A2 of the terminal set 3 are practically connected to the link III in parallel with the processor 14 of the controlling logic circuit 9 by means of an additional processor 15 which is located in the coupler 4 and which is provided in the form of a detachable module, e.g. a daughter card which is independently insertable in the digital telephone set.

The processors 14 and 15 (whose associated memories are not shown) are connected to each other via two one-way links SE and SR enabling them to be connected in parallel on the link III. The processor 15 takes the place of the processor 14 when sending signalling data to the computer 1 for use by the computer.

The processor 15 may be a 4-bit processor compatible with the processor 14, for example, and serves essentially to convert data received over the link 5 in the 8 Kbit/s signalling channel into data suitable for being accepted by the computer 1 after being prepared so as to be capable of transitting via one or other of the connectors 4A1 and 4A2, and also for converting signalling data transitting in the opposite direction as generated by the computer 1 acting instead of the telephone.

The processor 15 receives functional clock signals produced by a crystal clock 16 for the processor 14 and synchronizing signals HS for transmitting and receiving data over the link 5. Said synchronizing signals being the signals which are received by the processor 14 when the link between the computer 1 and the network 2 is not in operation.

In the embodiment shown, an additional link BP enables the processor 14 in the telephone to inform the processor 15 in the extension equipment that the signalling data to be transmitted via the link 5 exceed the size of the working memory zone of the processor 14 allocated for temporary storage of such data prior to transmission, thereby enabling such data to be stored in the working memory of the processor 15.

A surveillance circuit 17 resets both processors 14 and 15 to zero simultaneously, and it is activated in particular if the processor 14 of the telephone set ceases to provide the surveillance circuit with regular pulses specifying that it is operating properly. In this case, the surveillance circuit is based on an RC type circuit having a determined time constant.

The processor 15 is suitable for being connected firstly via the connector 4A1 and secondly via the connector 4A2 to the bus of a computer 1 equipped for this purpose. A setting arrangement 18 comprising buttons, switches, or straps enables the digital telephone set 3 to be configured as a function of the type of connection required by the computer. Naturally, it is possible to provide a software type of setting arrangement in the digital telephone set 3, or in the computer 1. Software setting may be by remote control from a digital telephone set for configuring an installation organized around a private exchange, e.g. an operator or installer digital telephone set.

An address circuit 19 which is preferably modifiable is also incorporated in the extension equipment 11 in order to allocate an individual address to the digital telephone set 3 in a series of equipments, should the telephone set be connected in series with other computer peripheral equipments to the bus of the computer 1.

The signalling to be transmitted by the link 5 from the network 2 to the computer 1 and via a V24 interface or an RS 232C link is sent through a voltage shifter 23 and via the connector 4A1. It transits via a send link EDS to the processor 15. A send authorization link DPE forces the transmission from the computer 1 to the processor 15 to take place at times set aside for such transmissions. These times are obtained from the clock signals AS as recovered from the signals transmitted to the telephone 3 via the link 5 in conventional manner which is not described here since not directly relevant to the invention. A link RDS serves to send characters or signalling data from the computer 1 to the telephone 3.

Alternatively the series connection of the digital telephone set 3 and the computer may be performed via the link L1A2 for signalling data, with couplers 20, e.g. photoelectric couplers, providing electrical isolation.

When a computer 1 is connected to a digital telephone set 3 connected to a digital exchange 13 of a telephone network 2, it is possible to set up a call through the exchange either from the telephone set or from the computer with signalling data, and in particular dialing being produced by one or the other, both being appropriately programmed for this purpose.

Similarly, the alphanumeric characters transmitted from one or the other via the link 5 or from the link 5 to one or the other are received by one or the other as soon as they can be used. This means in particular, that received alphanumeric characters are displayed for signalling purposes both on the display means of the telephone which may be constituted by a screen and/or by indicator lamps, for example, and on the screen of the computer 1 which, in this case, may have an activatable reproduction of the man/machine interface of the telephone set using techniques that are conventional in this context.

We claim:

1. An arrangement for connecting a personal computer to a telephone network via a digital exchange and via a telephone set or subscriber terminal suitable for processing telephone signalling and enabling simultaneous transfer of voice and data digital signals, the telephone set or terminal being controlled by an internal processor in a control logic circuit and including data transmission means for connection to a computer apparatus such as a computer, wherein the arrangement comprises a coupler integrated in the telephone set and connected to the control logic circuit thereof which is provided with means for diverting the telephone signal transmitted to the controlling logic circuit of the telephone towards an external access to the bus of the personal computer, and means for selectively replacing the telephone signal which the telephone would normally transmit to the exchange by corresponding signalling produced by the personal computer, the data transmissions which transit to and from the personal computer taking place separately via said data transmission means, and wherein the personal computer includes purely software means for producing the replacement telephone signalling, said signalling transitting via the same circuits in the telephone set as are used by the telephone signalling coming from the internal processor of the telephone.

2. A connection arrangement according to claim 1, wherein the telephone set whose controlling logic circuit is organized about a processor and its memories, includes a signalling auxiliary circuit organized around an additional processor suitable for interchanging telephone signalling between the telephone and the computer and connected for this purpose both to at least one computer bus connector and to the processor of the controlling logic circuit of the telephone for signalling transit purposes.

3. A connection arrangement according to claim 1, including a telephone set which is physically distinct from the computer and which is functionally incorporated in the computer as an accessory which is directly controllable by means of the normal controls of the computer.

4. A device for connecting a personal computer to a telephone network via a digital telephone set linked to an exchange said digital telephone set including a processor and memories in a controlling logic circuit, means for simultaneous transfer of digital voice and digital data signals, and first means for data signal transmission through said telephone set and said exchange, between said telephone network and an external computer linked to the telephone set, wherein said device further comprises a coupler including second means for data signal transmission between said processor and said computer, through a bus of said computer having an external access, said controlling logic circuit including means for diversion of telephone signalling from itself either to the computer or to the exchange according to transmission needs.

5. A device for connecting a personal computer to a telephone network via a telephone exchange and via a telephone set having a controlling logic circuit organized about a processor and memories and enabling digital voice and data signals to be transferred simultaneously and controlled by an internal processor, said telephone including data transmission means for connection to computer apparatus such as a computer, the device being wherein it comprises a coupler integrated in the telephone set and connected to the controlling logic circuit thereof, which logic circuit is provided with means for diverting the telephone signalling transmitted to the controlling logic circuit of the telephone set to an external access to the bus of the personal computer, and means for replacing the telephone signalling which the telephone set would normally transmit to the exchange with corresponding signalling produced by the personal computer which is suitably programmed for this purpose, data transmission to and from said computer that transit via the exchange taking place separately via the data transmission means, wherein the telephone set includes a coupler associating a data rate converter served by a connector for data transmission with the computer, and a signalling auxiliary circuit organized around an additional processor suitable for interchanging telephone signalling between the telephone and the computer and connected for this purpose firstly to at least one computer bus connector and secondly to the processor of the telephone controlling logic circuit for signalling transit purposes.

6. A connection arrangement according to claim 5, wherein the additional processor of the connection arrangement is connected in parallel with the processor of the telephone set to the telephone line of said telephone, via a common multiplexer/demultiplexer and a common line interface.

* * * * *